(12) United States Patent
Kanaris

(10) Patent No.: US 7,870,949 B2
(45) Date of Patent: Jan. 18, 2011

(54) METHOD FOR BONDING A COATING ON A ROLLER

(75) Inventor: Alexander Kanaris, Richmond Hill (CA)

(73) Assignee: Van Der Graaf Inc., Brampton, Ontario (CA)

( * ) Notice: Subject to any disclaimer, the term of this patent is extended or adjusted under 35 U.S.C. 154(b) by 0 days.

(21) Appl. No.: 11/179,559

(22) Filed: Jul. 13, 2005

(65) Prior Publication Data

US 2007/0012549 A1    Jan. 18, 2007

(51) Int. Cl.
B65G 23/04    (2006.01)
B65G 13/00    (2006.01)

(52) U.S. Cl. .................. 198/835; 193/35 R; 193/37

(58) Field of Classification Search .................. 198/835; 193/35 R, 37; 492/35, 28
See application file for complete search history.

(56) References Cited

U.S. PATENT DOCUMENTS

| | | | |
|---|---|---|---|
| 3,661,246 A | 5/1972 | Faunce et al. | |
| 3,713,348 A | 1/1973 | Conrad et al. | |
| 3,972,414 A | 8/1976 | Conrad | |
| 4,140,216 A | 2/1979 | Conrad | |
| 4,592,463 A | 6/1986 | Puskar | |
| 4,832,186 A | 5/1989 | Conrad | |
| 5,011,060 A * | 4/1991 | Cramer | 226/15 |
| 5,205,893 A | 4/1993 | New et al. | |
| 5,213,202 A * | 5/1993 | Arnold | 198/835 |
| 5,281,189 A | 1/1994 | Agnoff | |
| 5,319,430 A * | 6/1994 | DeBolt et al. | 399/322 |
| 5,524,740 A * | 6/1996 | Conley | 193/37 |
| 6,099,427 A * | 8/2000 | Brown | 474/188 |
| 6,443,297 B1 * | 9/2002 | Johnston | 198/835 |

* cited by examiner

*Primary Examiner*—Gene Crawford
*Assistant Examiner*—Ramya Prakasam
(74) *Attorney, Agent, or Firm*—Hoffmann & Baron, LLP

(57) ABSTRACT

A roller for a conveyor comprising a cylindrical core defining a support surface; a helical groove disposed in said support surface and lagging bonded to said support surface.

24 Claims, 3 Drawing Sheets

METHOD FOR BONDING A COATING ON A ROLLER

FIELD OF INVENTION

This invention relates to a roller for a conveyor and a method relating to same; and particularly relates to urethane lagging bonded to a helical groove disposed in a support surface of a roller and a method of making same.

BACKGROUND TO THE INVENTION

There are numerous types of conveyor rollers systems that have been proposed. Most of these conveyor roller systems consist of a continuous belt or conveyor media which travels over a series of rollers. The rollers may be simple shafts having a cylindrical support surface or more advanced drums which use enclosed and sealed drive rollers with drive motors contained inside the rollers themselves.

Such rollers can be covered with a multitude of materials that are attached by various methods. The covering which is sometimes referred to as lagging is used to increase the co-efficient of friction between the conveyor roller and the belt, reduce the wear on the conveyor roller and the conveyor belt, and in some cases effect a self-cleaning action as particularized in U.S. Pat. No. 5,213,202.

The most commonly used lagging is made of elastomeric components, which are bonded and cured by vulcanization, to the roller and extend around the roller. Other common methods of attaching the lagging materials to the roller include bolting, painting, cementing, or spraying. Again, all as disclosed in U.S. Pat. No. 5,213,202.

The lagging thickness can vary from a few thousandths of an inch with sprayed on coatings to a considerable thickness as with some rubber vulcanized coatings.

In some of the prior art devices the lagging material exhibits a multiplicity of longitudinally spaced drive surfaces with helical grooves formed in the lagging material as for example disclosed in U.S. Pat. No. 5,213,202.

In other cases fiberglass reinforced polyester can be used as disclosed in U.S. Pat. No. 4,312,444.

Still other patents disclose the use of spiraling coiled wire ribbing having a wave form as particularized in U.S. Pat. No. 3,972,414.

Other prior art devices and methods utilize both a left hand and right hand helical thread to aid in the aligning of a belt around the rollers such as disclosed in U.S. Pat. No. 3,972,414.

Furthermore the use of urethane compounds or the like to form the right and left hand threads of an idle roller are shown in U.S. Pat. No. 3,661,246.

Other arrangements and methods of producing rollers are disclosed in U.S. Pat. Nos. 5,205,893, 4,723,646 and 1,980,777.

It is an object of this invention to provide a improved roller for a conveyor system and method of producing same.

It is an aspect of this invention to provide for a roller for a conveyor comprising, a cylindrical core defining a support surface, a helical groove disposed in the support surface, and lagging bonded to the support surface. In one aspect the lagging comprises urethane.

It is another aspect of this invention to provide a roller for a conveyor comprising, a drum defining a support surface having a generally cylindrical shape with an axis of rotation, a helical groove disposed in the support surface, urethane bonded to the helical groove disposed on said support surface.

It is another aspect of this invention to provide a method of coating a roller comprising, rotating the roller, applying urethane unto an outer support surface of the rotating roller while axially moving the urethane to coat the roller, and curing the urethane.

These and other objects of the invention shall now be described in relation to the following drawings.

BRIEF DESCRIPTION OF DRAWINGS

FIG. 4 is a side elevational view of FIG. 3a.

DETAILED DESCRIPTION OF THE INVENTION

Figure 1:
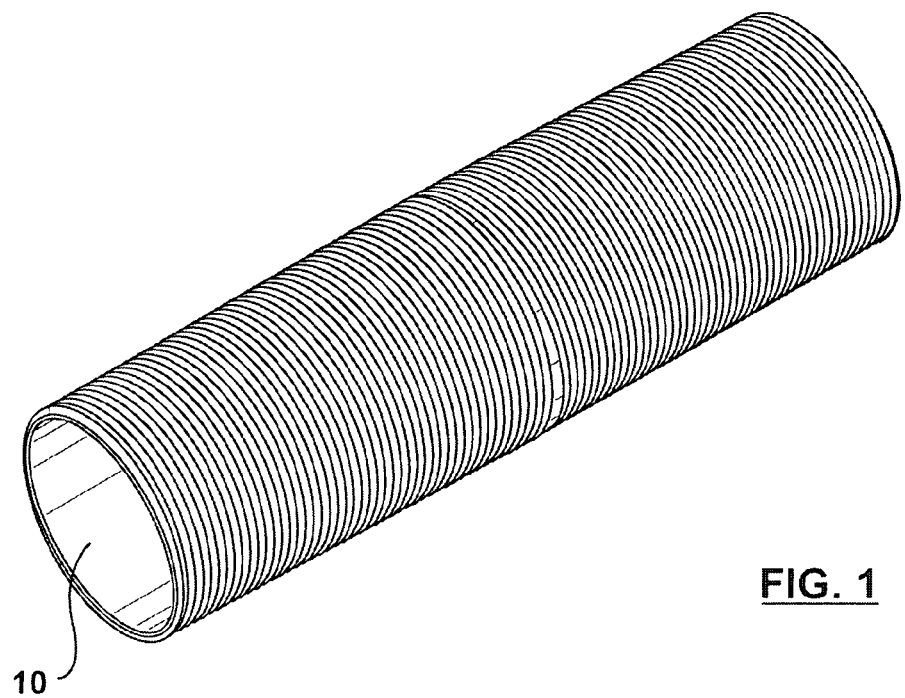
FIG. 1 is a perspective view of the roller showing opposed helical grooves disposed on the outer surface of the roller.

In the description which follows, like parts are marked throughout the specification and the drawings with the same respective reference numerals. The drawings are not necessarily to scale and in some instances proportions may have been exaggerated in order to more clearly depict certain features of the invention.

Figure 5:
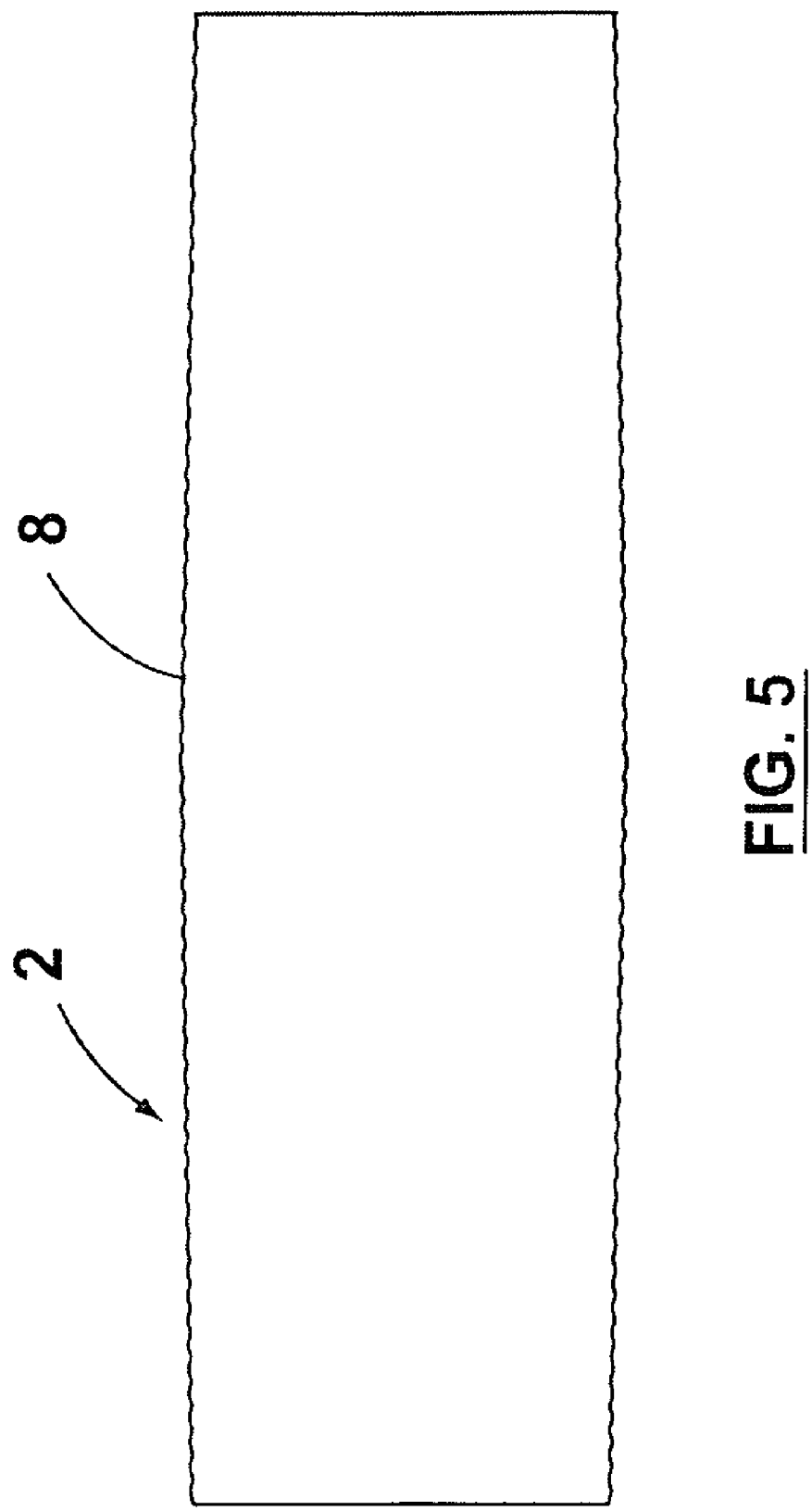
FIG. 5 illustrates the coated roller.

FIG. 5 illustrates the coated roller 2 which comprises of a cylindrical core 4 defining a support surface 6 and lagging material 8 bonded to the support surface. The outer support surface can be treated so as to increase the bonding characteristics of the lagging material to the outer surface. For example, the outer surface can be roughened or a plurality of troughs and crests can be imparted for example by forming a helical groove in the outer surface. In a preferred embodiment of the invention the lagging material comprises urethane.

The cylindrical core 4 as shown in the drawings is hollow as at 10 and can be adapted to house a motor for rotationally driving the roller in a manner well known to those persons skilled in the art. However, the invention should not be limited to hollow cores as the invention can be applied to simple shafts, idler rollers or the like.

In particular the core 4 has a helical groove 12 formed on the support surface 6. As shown the support surface 6 has a generally cylindrical shape with an axis of rotation 14.

Figure 2:
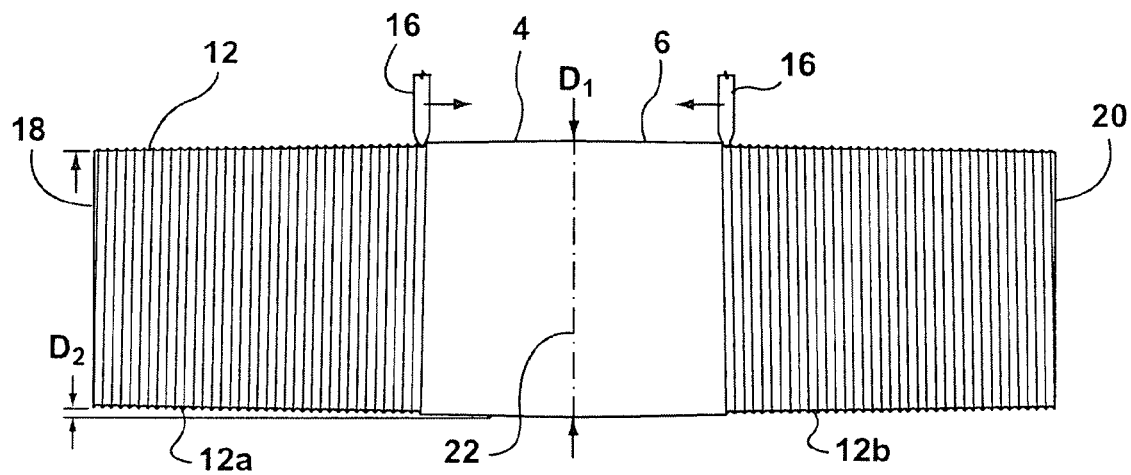
FIG. 2 is a side elevational view showing forming of the helical grooves in the outer surface of a cylinder.
Figure 4:
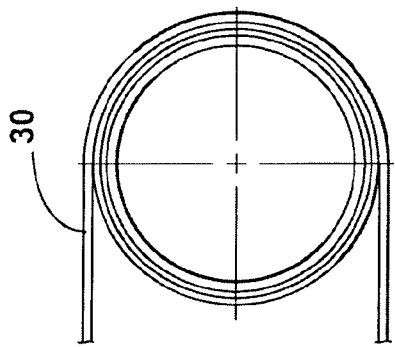

FIG. 2 illustrates that the helical groove 12 can be formed by cutting tools 16 which in one embodiment are found on a lathe machine. In particular the core which initially starts of as a smooth outer diameter may be placed in a lathe (not shown) so as to rotate the core while at the same time axially moving the cutter 16 in the direction shown.

In one embodiment the helical groove may start from one end 18 and travel to the other end 20. In the embodiment shown in FIG. 2, two opposed helical grooves are formed by axially moving one cutter 16 from one end 18 towards an intermediate area 22 so as to produce a right handed helical thread as shown. Thereafter a left handed helical thread can be produced at the other end 20 by moving a cutter 16 in the direction shown towards the intermediate area 22.

Furthermore in another embodiment the cutter 16 may be radially moved outwardly at the same time that the cutter 16 is axially moved along the core 14 so as to produce an intermediate area 22 having an outer diameter $D_1$ which is greater than the outer diameter of the ends $D_2$ so as to crown the outer support surface of the roller 2.

The crowning and left and right hand threads assist in the centering of the belt 30.

After the helical grooves 12 have been applied to the outer support surface 6 the lagging material 8 may be applied thereto.

Figure 3A:
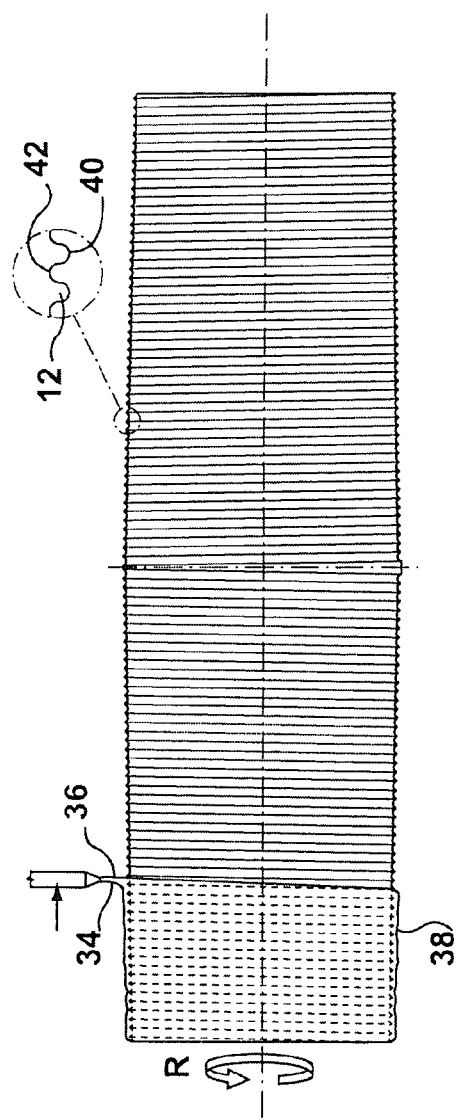
FIGS. 3a and 3b illustrate the application of urethane unto the outer surface of the roller.
Figure 3B:
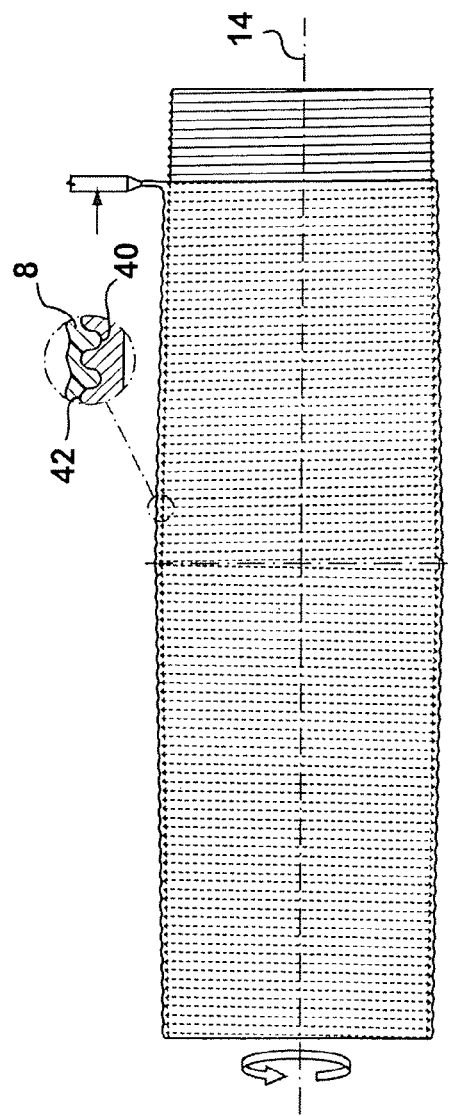

FIGS. 3a and 3b illustrate schematically how the lagging material is applied to the outer support surface 6 of the core 4.

In particular the urethane is applied to the outer diameter of the support surface 6. In particular the urethane is applied by pouring on the urethane through a nozzle 32 as shown. The urethane pours out as a liquid under the influence of gravity and contacts the outer support surface 6 while the core 4 is rotated in direction R as shown. At the same time the nozzle 32 is selected to axially move as shown whereby the urethane is deposited as a fluid ribbon on the outside support surface. The rate of axially disposing the nozzle A relative to the rotation R is selected such that the urethane is deposited as a ribbon or line whose edges 34 and 36 merge with adjacent ribbons deposited on the outside diameter of the core 4. In other words, the urethane is deposited on the outside diameter as a ribbon or a line which blends with the ribbon or line previously deposited along the core 4 so as to produce a urethane covering 38 as first shown in FIG. 3a. More particularly as the nozzle 32 travels along the axial extent of the core 4, the covering will move along the entire length of the core 4 as shown in FIG. 3b so as to produce the product shown in FIG. 5.

One example of the urethane that can be utilized herein can be purchased from Uniroyal, however, other suppliers can be used. The urethane is introduced into a suitable holder or hopper communicating with the nozzle 32 so as to produce a liquid flowable urethane that is deposited on the outside diameter of the core 4. The temperature of the urethane can be selected between the range 80° F. and 90° F. provided that the material flows as a liquid. However, the temperature range is only shown as an example as other suitable temperature ranges can be selected. Thereafter the urethane quickly cures as it is being deposited unto the core 4.

In one example, the core 4 can be rotated at 40 to 80 rpm and the urethane deposited at a rate of 3 to 6 inches along the circumference per second assuming diameter of 4 to 30 inches, where the urethane is applied at a temperature of 80° F. and 90° F. In such example the urethane will cure substantially with one rotation of the core. Although cured the urethane may still be slightly tacky. It should be noted that the parameters given are by way of example only, and other rpm's, diameters and temperatures could be selected within the spirit of the invention described.

In one particular embodiment the core 4 can comprise of a metal such as aluminum or the like. However, other metals can be used, so long as the cover, i.e. lagging material bonds to the outer surface. Accordingly as the urethane is deposited along the outside diameter of the core the metallic core quickly conducts the heat from the urethane so as to quickly cure the urethane unto the roller.

More particularly FIGS. 3b and 5 show that the outer surface of the urethane is not smooth. In other words, the waviness or irregularity of the urethane is apparent from the figures. Such irregularity in the outside surface of the urethane results from the undulating pattern beneath the urethane. This irregularity is due to the helical grooves as the urethane cures. Such undulation or irregularity or non-smooth surface actually aids in improving the traction between the outer surfaces of the urethane coated roller and the belt 30. In other words the invention described herein exhibits a high co-efficient of friction between the urethane surface and the belt 30.

Furthermore the two opposed helical grooves namely the left and right hand grooves 12a and 12b are active through the urethane such that the lagging surface centers and spreads out the belt 30 towards the ends 18 and 20. In other words the influence of the grooves and difference in diameter $D_1$ and $D_2$ is translated through the urethane since the urethane cures to the shape of the grooves and as reflected in the undulations previously described.

Generally speaking the time frame of curing occurs within a matter of seconds after the urethane has been deposited unto the outer surface of the core, but other time frames can be used.

The invention described herein illustrates a roller for a conveyor comprising a cylindrical core 4 defining a support surface 6 and a helical groove 12 disposed in the support surface 6 and lagging 8 bonded to the support surface 6.

Furthermore the outer diameter $D_1$ tapers from the central or intermediate region 22 to the opposed ends 18 and 20 of the core 4.

In one embodiment the roller for the conveyor comprises a drum defining a support surface 6 having a generally cylindrical shape with an axis of rotation, and a helical groove 12 disposed in the support surface, with urethane bonded to the helical groove 12 disposed in the support surface.

The invention also describes a method of coating a roller comprising rotating the roller in the direction R and applying urethane unto the outer support surface 6 while axially moving the urethane to coat the roller, and curing the urethane.

The thickness of the lagging material can be applied from within a few thousandths of an inch to up to 125 thousandths of an inch or even more. However, the invention should not be limited to the thicknesses shown as any desired thickness can be selected by selecting the speed of rotation and the axial movement of the nozzle 32 so as to produce a covering which is bonded to the metallic core. Furthermore the thickness of the lagging will not be uniform as the liquid urethane will tend to flow within the troughs 40 from the crest 42 regions of the grooves 12 as best shown in FIGS. 3a and 3b.

Various embodiments of the invention have now been described in detail. Since changes in and/or additions to the above-described best mode may be made without departing from the nature, spirit or scope of the invention, the invention is not to be limited to said details.

I claim:

1. A roller for a conveyor, the roller comprising:
   a cylindrical core defining a first surface;
   a helical groove disposed in said first surface; and
   a layer of lagging covering a circumference of at least a portion of said helical groove disposed in said first surface, said layer of lagging defining a second surface, spaced from said first surface, said second surface adapted to contact a conveyor medium.

2. The roller for a conveyer as claimed in claim 1 wherein said lagging comprises urethane.

3. The roller as claimed in claim 2 wherein said cylindrical core defines an outer diameter, and said outer diameter tapers from a central region of said cylindrical core to opposite ends of said cylindrical core.

4. The roller as claimed in claim 2 wherein said second surface is a non-smooth surface.

5. The roller as claimed in claim 4 wherein said second surface is wavey.

6. The roller as claimed in claim 1 wherein said cylindrical core comprises aluminum.

7. The roller as claimed in claim 1 wherein said cylindrical core is hollow.

8. The roller for a conveyor as claimed in claim 1 comprising at least first and second helical grooves disposed in said first surface.

9. The roller for a conveyor as claimed in claim 8 wherein said first and second helical grooves start and end at opposite ends of said cylindrical core.

10. The roller for a conveyor as claimed in claim 9, wherein said first helical groove is formed with a right-hand orientation and said second helical groove is formed with a left-hand orientation.

11. The roller as claimed in claim 1 wherein said layer of lagging is bonded to said first surface of said cylindrical core.

12. The roller as claimed in claim 1 further comprising a helical groove disposed in said second surface matching said helical groove disposed in said first surface.

13. A roller for a conveyor, the roller comprising:
 a drum defining a first surface, said drum having a generally cylindrical shape with an axis of rotation;
 a helical groove disposed in said first surface; and
 a layer of urethane lagging covering a circumference of at least a portion of said helical groove disposed in said first surface, said layer of urethane lagging defining a second surface, spaced from said first surface, said second surface adapted to contact a conveyor medium.

14. The roller as claimed in claim 13 wherein said helical groove disposed in said first surface tapers towards opposite ends of said drum.

15. The roller as claimed in claim 14 wherein said first surface presents an intermediate area between said opposite ends, the outer diameter of said intermediate area being greater than the outer diameter of said opposite ends.

16. The roller for a conveyor as claimed in claim 13 comprising at least first and second helical grooves disposed in said first surface.

17. The roller for a conveyor as claimed in claim 16, wherein said first and second helical grooves start and end at opposite ends of said cylindrical core.

18. The roller for a conveyor as claimed in claim 17, wherein said first helical groove is formed with a right-hand orientation and said second helical groove is formed with a left-hand orientation.

19. The roller as claimed in claim 13 wherein said second surface is a non-smooth surface.

20. The roller as claimed in claim 19 wherein said second surface is wavey.

21. The roller as claimed in claim 13 further comprising a helical groove disposed in said second surface matching said helical groove disposed in said first surface.

22. The roller as claimed in claim 13 wherein said layer of lagging is bonded to said first surface of said drum.

23. The roller as claimed in claim 13 wherein said drum comprises aluminum.

24. The roller as claimed in claim 13 wherein said drum is hollow.

* * * * *